United States Patent
Chawla et al.

(10) Patent No.: US 11,354,378 B2
(45) Date of Patent: Jun. 7, 2022

(54) WEB EXPERIENCE AUGMENTATION BASED ON LOCAL AND GLOBAL CONTENT PREFERENCES

(71) Applicant: Adobe Inc., San Jose, CA (US)

(72) Inventors: Kushal Chawla, Rohini (IN); Soumya Vadlamannati, Hyderabad (IN); Niyati Himanshu Chhaya, Hyderabad (IN); Aman Deep Singh, Auraiya (IN); Aarushi Agrawal, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/570,910

(22) Filed: Sep. 13, 2019

(65) Prior Publication Data

US 2021/0081467 A1 Mar. 18, 2021

(51) Int. Cl.
| | |
|---|---|
| G06F 16/958 | (2019.01) |
| G06N 3/08 | (2006.01) |
| H04L 67/50 | (2022.01) |
| G06N 3/04 | (2006.01) |
| H04L 67/025 | (2022.01) |
| G06F 40/166 | (2020.01) |
| G06F 40/197 | (2020.01) |

(52) U.S. Cl.
CPC ......... *G06F 16/958* (2019.01); *G06F 40/166* (2020.01); *G06F 40/197* (2020.01); *G06N 3/0445* (2013.01); *G06N 3/08* (2013.01); *H04L 67/025* (2013.01); *H04L 67/22* (2013.01)

(58) Field of Classification Search
CPC .... G06F 16/958; G06F 40/166; G06F 40/197; G06F 40/103; G06F 40/134; G06F 40/137; G06F 40/14; G06F 40/131; G06F 40/16; G06F 40/216; G06F 40/284; G06F 40/30; G06F 16/335; G06F 16/337; H04L 67/025; H04L 67/22
USPC ....................................................... 715/229
See application file for complete search history.

(56) References Cited

U.S. PATENT DOCUMENTS

| | | | | |
|---|---|---|---|---|
| 6,401,077 B1 * | 6/2002 | Godden | ................. | G06Q 30/06 705/26.8 |
| 7,853,558 B2 * | 12/2010 | Brindley | ............ | G06Q 30/0256 707/608 |

(Continued)

OTHER PUBLICATIONS

Agrawal, "Mining Sequential Patterns", In Data Engineering, 1995. Proceedings of the Eleventh International Conference, Mar. 5, 1995, 12 pages.

(Continued)

*Primary Examiner* — Chau T Nguyen
(74) *Attorney, Agent, or Firm* — FIG. 1 Patents

(57) ABSTRACT

A web experience augmentation system predicts, during a web browsing session of a user, augmentation data that the user is likely to want to view during the web browsing session. This prediction is based on both local content preferences for the user and global content preferences. The local content preferences for the user refer to an indication of the webpages accessed during the current web browsing session of the user. The global content preferences refer to analytics for webpages on a website obtained over an extended period of time that extends prior to the web browsing session of the user. The web experience augmentation system also modifies a webpage to which the user navigates to include the predicted augmentation data.

20 Claims, 9 Drawing Sheets

(56) References Cited

U.S. PATENT DOCUMENTS

| | | | |
|---|---|---|---|
| 10,733,638 B1* | 8/2020 | Jain | G06F 16/9574 |
| 2005/0131944 A1* | 6/2005 | Patrick | G06Q 30/02 |
| 2010/0332967 A1* | 12/2010 | Kraft | G06F 16/9577 |
| | | | 715/234 |
| 2014/0236875 A1* | 8/2014 | Phillipps | G06F 16/957 |
| | | | 706/12 |
| 2016/0071143 A1* | 3/2016 | Pokorney | G06Q 30/02 |
| | | | 705/14.43 |
| 2019/0026814 A1* | 1/2019 | Parameshwara | G06Q 30/0631 |
| 2019/0197193 A1* | 6/2019 | Williams | G06F 16/955 |
| 2019/0259054 A1* | 8/2019 | Minnis | G06F 16/9535 |
| 2019/0347672 A1* | 11/2019 | Chaar | G06F 16/9535 |
| 2020/0341777 A1* | 10/2020 | Kashyn | G06F 11/3636 |

OTHER PUBLICATIONS

Bellman,"Dynamic Programming", Jul. 1, 1966, 2 pages.
Bouras,"Predictive Prefetching on the Web and its Potential Impact in the Wide Area", Jun. 2004, 38 pages.
Burke,"Hybrid Recommender Systems: Survey and Experiments", User modeling and user-adapted interaction 12, 4 (2002), Nov. 2002, 29 pages.
Cer,"Universal Sentence Encoder", Apr. 12, 2018, 7 pages.
Cheng,"Wide & Deep Learning for Recommender Systems", Jun. 24, 2016, 4 pages.
Das,"Gaussian LDA for Topic Models with Word Embeddings", Proceedings of the 53rd Annual Meeting of the Association for Computational Linguistics and the 7th International Joint Conference on Natural Language Processing (vol. 1: Long Papers). vol. 1. 2015., Jul. 2015, pp. 795-804.
Gomez-Uribe,"The Netflix Recommender System: Algorithms, Business Value, and Innovation", ACM Transactions on Management Information Systems (TMIS) 6.4 (2016): 13, Dec. 2015, 19 pages.
Gunduz,"A User Interest Model for Web Page Navigation", Proc. Int. Workshop on Data Mining for Actionable Knowledge, Jan. 2003, 12 pages.
Gunduz,"A Web Page Prediction Model Based on Click Stream Tree Representation of User Behavior", Aug. 2003, 6 pages.
Hidasi,"Parallel Recurrent Neural Network Architectures for Feature-rich Session-based Recommendations", Proceedings of the 10th ACM Conference on Recommender Systems. ACM, 2016, Sep. 2016, 8 pages.
Hidasi,"Session-based Recommendations with Recurrent Neural Networks", Mar. 29, 2016, 10 pages.
Hochreiter,"Long Short-Term Memory", In Neural computation, 1997, Nov. 15, 1997, 32 pages.
Le,"Distributed Representations of Sentences and Documents", International Conference on Machine Learning. (2014), May 2014, 9 pages.
Lin,"Reinforcement Learning for Robots Using Neural Networks", Technical Report. Carnegie-Mellon Univ Pittsburgh PA School of Computer Science., Jan. 6, 1993, 168 pages.
Mnih,"Playing Atari with deep reinforcement learning", Dec. 19, 2013, 9 pages.
Mobasher,"Effective Personalization Based on Association Rule Discovery from Web Usage Data", Proceedings of the 3rd international workshop on Web information and data management, Oct. 2001, 7 pages.
Murtagh,"Ward's Hierarchical Agglomerative Clustering Method: Which Algorithms Implement Ward's Criterion?", Oct. 18, 2014, pp. 274-295.
Parzych,"Predicting the future with multi-page predictive prefetching", Retrieved at https://www.instart.com/blog/predicting-future-multi-page-predictive-prefetching—on Jul. 16, 2019, 4 pages.
Redzebra,"Predicting online user behavior using deep learning algorithms", May 26, 2016, 21 pages.
Rousseeuw,"Silhouettes: a graphical aid to the interpretation and validation of cluster analysis", J. Comput. Appl. Math. 20, 1 (1987), Jun. 13, 1986, pp. 53-65.
Sarukkai,"Link Prediction and Path Analysis Using Markov Chains", Jun. 2000, 15 pages.
Wu,"Personal Recommendation Using Deep Recurrent Neural Networks in NetEase", May 2016, 12 pages.
Zhang,"Deep Learning based Recommender System: A Survey and New Perspectives", Aug. 3, 2017, 35 pages.
Zhao,"Recommendations with Negative Feedback via Pairwise Deep Reinforcement Learning", Aug. 10, 2018, 9 pages.

* cited by examiner

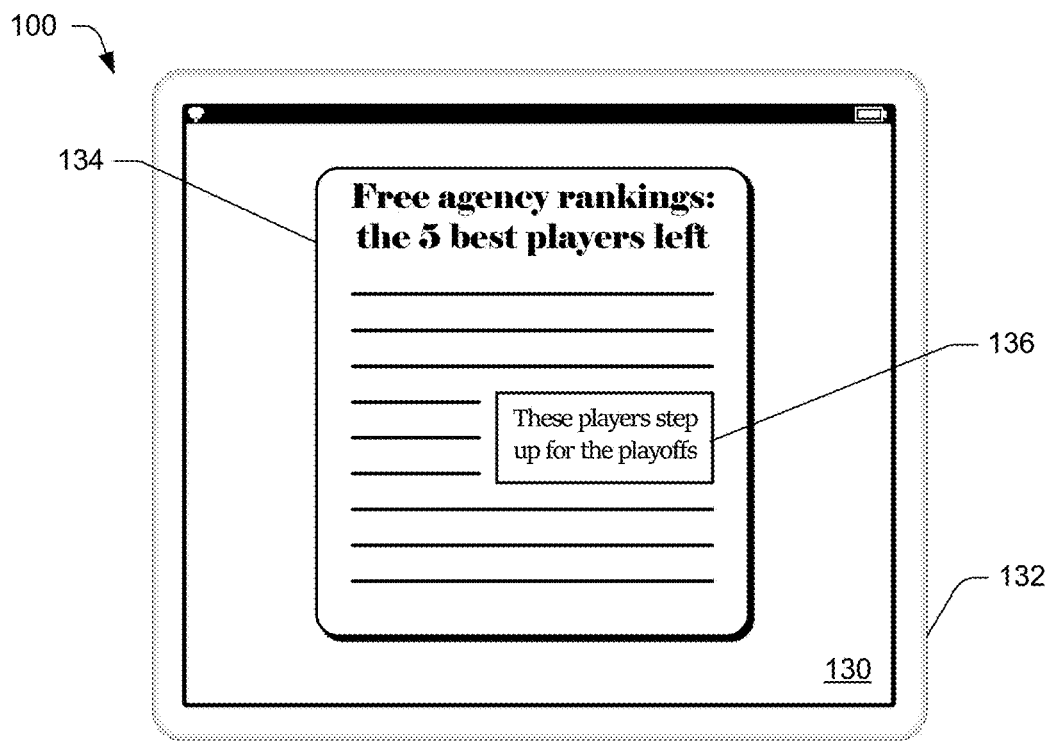
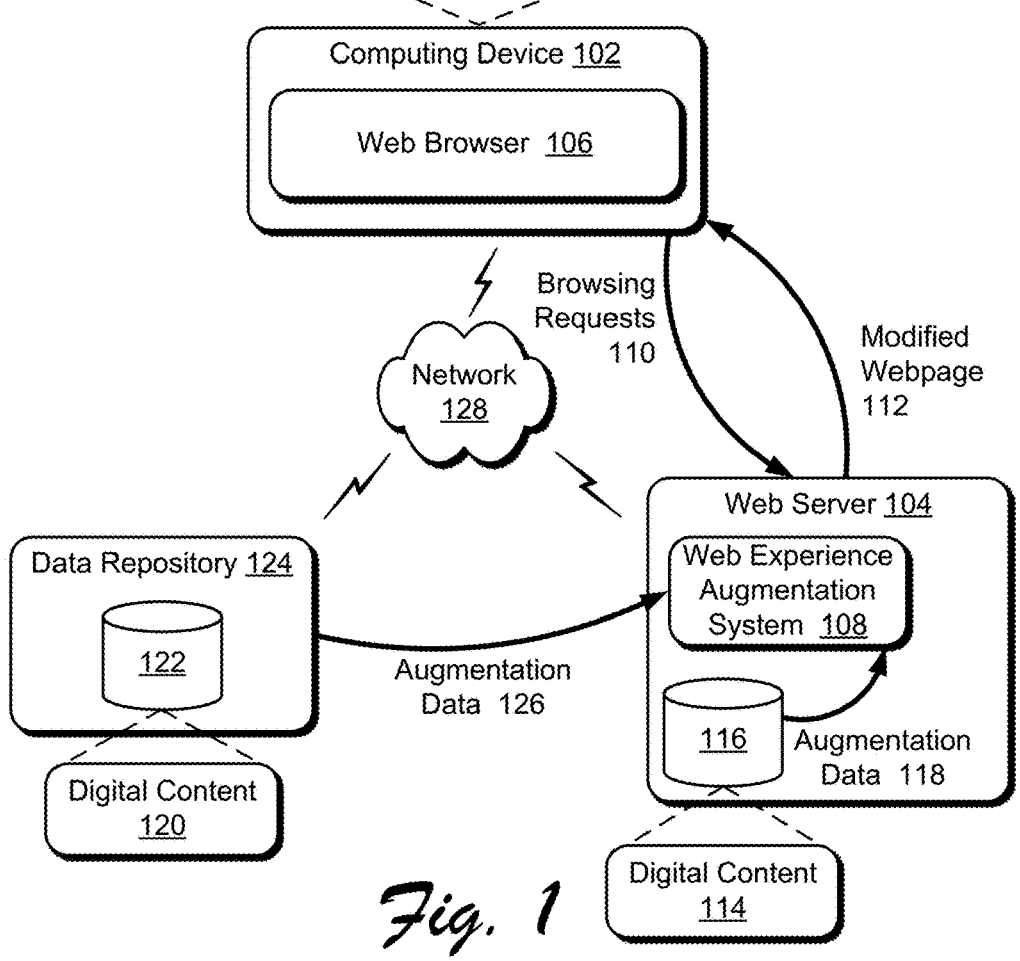
Fig. 1

WEB EXPERIENCE AUGMENTATION BASED ON LOCAL AND GLOBAL CONTENT PREFERENCES

BACKGROUND

As computer technology has advanced computers have become increasingly commonplace in our lives and have found a wide variety of different uses. One such use is to access information over the World Wide Web (the web). Various companies, organizations, and institutions make a wide range of digital content available on the web. This digital content can take various forms, such as news content, educational content, content describing services or products available, and so forth.

Oftentimes the content on the web is not personalized to each individual user. This results in generic digital content being presented to users with each user receiving the same digital content. For example, a news website may include hundreds of different webpages each with a different news article and links to multiple additional news articles, and users that click on the same links on a webpage end up seeing the same news articles and links to the same multiple additional news articles.

In some situations users create accounts and user preferences are tracked, allowing websites to customize digital content to users based on these preferences. For example, a user may create an account on a news website and indicate categories of news that he or she prefers. When the user subsequently accesses the website and logs into his or her account, the website provides webpages with news articles and links to other news articles in those categories. While such scenarios allow for personalization of websites to individual users, they are not without their problems. For example, these scenarios oftentimes require a user to create an account and manually specify his or her preferences, or have his or her activities on a website tracked and associated with an account or other identifier created for him or her.

Conventional solutions for web browsing thus have various drawbacks. One such drawback is that websites may not be customized to the user, resulting in the user receiving the same generic digital content as other users. Another such drawback is that if the websites are customized, typically this customization requires the user to generate an account or otherwise be tracked across multiple web browsing sessions, thus requiring the user to give up some anonymity. These drawbacks to conventional solutions for web browsing can lead to user frustration with their computers and web browsing programs.

SUMMARY

To mitigate the drawbacks of conventional web browsing solutions, a web experience augmentation system is described to predict augmentation data for webpages based on both local content preferences for the user and global content preferences. A request is received, from a computing device, for a first webpage that a user navigated to during a web browsing session. The first webpage is obtained, as are both local content preferences for the user and global content preferences. The local content preferences include a navigation path through multiple webpages that the user has taken during the web browsing session. One of multiple plausible pieces of augmentation data is identified based on the local content preferences and the global content preferences. The first webpage is modified to include as augmentation data the identified one of the multiple plausible pieces of augmentation data, and the modified webpage is caused to be communicated to the computing device in place of the first webpage.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of a web experience augmentation digital medium environment in an example implementation that is operable to employ the web experience augmentation based on local and global content preferences described herein.

DETAILED DESCRIPTION

Overview

Figure 2:
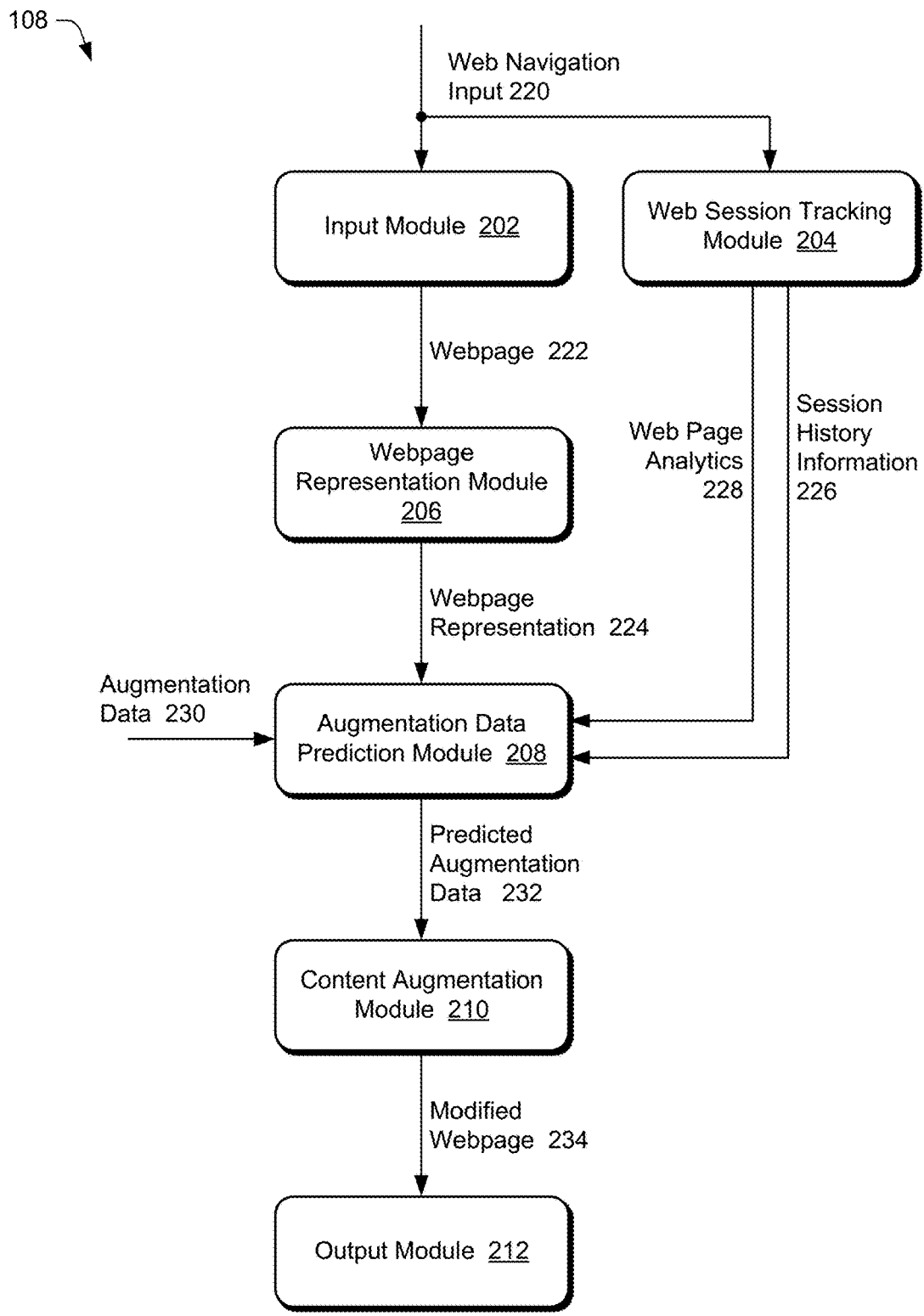
FIG. 2 is an illustration of an example architecture of a web experience augmentation system.

Current solutions for web browsing have various drawbacks. One such drawback is that websites may not be customized to the user, resulting in the user receiving the same generic digital content as other users. Another such drawback is that if the websites are customized to the user, this customization typically requires the user to generate an account or otherwise be tracked across multiple web browsing sessions, thus requiring the user to give up some anonymity.

To overcome these drawbacks, a web experience augmentation system predicts and modifies a webpage to include, during a web browsing session of a user, augmentation data that the user is likely to want to view during the web browsing session. This prediction is based on both local content preferences for the user and global content preferences. The local content preferences for the user refer to an indication of the webpages accessed during the current web browsing session of the user. The global content preferences refer to analytics for webpages on a website obtained over an extended period of time that extends prior to the web browsing session of the user, such as the number of times each webpage has been viewed, the amount of time spent on each webpage, the number of entries to each webpage, the number of exits from each webpage, the bounce rate for each webpage, and so forth.

More specifically, the web experience augmentation system receives a request for a webpage that a user navigated to during a web browsing session and generates a webpage representation for the webpage. The webpage representation is a succinct representation of the content pieces on the webpage, effectively a signature that captures the key aspects of the content and optionally the structure of the webpage, such as a vector of numbers. Various different features can be included in the webpage representation, such as one or more of features generated from a document to vector technique that generates a vector representing text in a webpage, features generated from topic modelling techniques that identify features of a word space that capture semantic regularities in language (e.g., on a webpage), analytics features that are various webpage analytics for the webpage, page level features for the webpage (e.g., the number of images on the webpage, the number of paragraphs on the webpage, the number of videos on the webpage), Uniform Resource Locator (URL) features for the webpage (e.g., a category and a subcategory of the webpage, within the website hierarchy, that the webpage belongs to), image or video features that describe an image or video on the webpage, and so forth.

The web experience augmentation system identifies augmentation data for the webpage that the user has navigated to based on local content preferences of the user, global content preferences, the webpage that the user has navigated to, and a set of augmentation data. The particular webpage analytics used as the global content preferences can be, for example, webpage analytics that correspond to the one or more key performance indicators (KPIs) that the owner or administrator of a website implementing the web experience augmentation system desires. The incorporation of analytics allows the web experience augmentation system to better predict the future content preferences of users based on the local content preferences while also catering to various business objectives of the owner or administrator of the website.

The set of augmentation data refers to digital content that can be used to augment the webpage the user navigated to. The set of augmentation data can include various types of digital content, such as other webpages, data from other sources (e.g., user-generated content, such as data from social media websites), hyperlinks, video, images, pieces of text, and so forth. A representation of each piece of digital content (e.g., each webpage, each social media post) in the set of augmentation data is generated. The representation of a piece of digital content in the set of augmentation data is a succinct representation of the piece of digital content, effectively a signature that captures the key aspects of the piece of digital content and optionally the structure of the piece of digital content, such as a vector of numbers. The representation of a piece of digital content in the set of augmentation data can be generated in the same manner, using the same features, as the webpage representation discussed above.

In one or more implementations, the web experience augmentation system includes a machine learning system, which can be implemented using various different machine learning techniques, such as a neural network based function approximator. The machine learning system can identify augmentation data for the webpage that the user has navigated to based on inputs including the webpage representations of the webpages the user has navigated to in the current web browsing session, global content preferences for the webpages the user has navigated to in the current web browsing session, the representations of the different pieces of digital content in the set of augmentation data, and the global content preferences for the digital content in the set of augmentation data.

The task of identifying the augmentation data can be modeled as a Markov Decision Process (MDP) with the tuple ($\mathcal{S}, \mathcal{A}, \mathcal{P}, \mathcal{R}, \gamma$). The value $\mathcal{S}$ refers to the State space, which captures the current local and global content preferences. The value $\mathcal{A}$ refers to the Action space A, which is the augmentation data (e.g., a set of all webpages on a website). The value $\mathcal{P}$ refers to Transition probabilities, which are the probability p(s'|s, a) moves to state s' by taking an action a in the state s. The value $\mathcal{R}$ refers to capturing the feedback received after taking a particular action. The value $\gamma$ refers to the discount factor for future rewards in the current web browsing session. The goal of the MDP is to learn a policy $\pi\colon \mathcal{S} \to \mathcal{A}$ to maximize the cumulative reward of the system.

To deal with the large and dynamic action spaces of webpages on websites, the web experience augmentation system can use a Deep Q-Learning model-free approach. Given a state-action pair, the web experience augmentation system generates a corresponding Q-value Q(s, a). The optimal Q-value Q*(s, a) follows the Bellman equation. The web experience augmentation system can include a machine learning system that is a neural network based function approximator that, given a state-action pair, generates the corresponding Q-value Q(s, a). The piece of digital content in the set of augmentation data that corresponds to the representation of the augmentation data having the best (e.g., highest) score generated by the machine learning system is selected as the identified augmentation data.

Given the identified augmentation data, the web experience augmentation system modifies the webpage to which the user navigated to include the identified augmentation data. The modified webpage is caused to be communicated to the computing device, allowing the modified webpage to be displayed at a remote computing device for the user. Including the identified augmentation data on the webpage can be performed in different manners, such as adding the augmentation data itself to the webpage, adding a link to the augmentation data on the webpage, and so forth. In one or more implementations, the web experience augmentation system adds the identified augmentation data to the webpage by locating the augmentation data at a location where a dynamic element on the webpage exists. Additionally or alternatively, the web experience augmentation system can add the identified augmentation data at a particular location of the webpage (e.g., at the bottom of the webpage), can replace content on the webpage with the identified augmentation data, and so forth.

The web experience augmentation system also presents a user interface allowing a person, such as a website developer or administrator, to set various configuration parameters for the web experience augmentation system as well as receive feedback regarding how the web experience augmentation system is operating. For example, the user interface can include a user path section that identifies the path (e.g., URLs) on the website that the user has taken. By way of another example, the user interface can include an orchestration dashboard section that allows the website developer or administrator to configure various aspects of the web experience augmentation system, such as whether to allow or disallow content replacement, whether the augmentation data can be user-generated content (e.g., posts on social media websites), and so forth.

By way of another example, the user interface can include an analytics data section that displays various analytics information. By way of another example, the user interface can include a high frequency wordcloud section that is a representation of the content that the user has seen so far during the web browsing session. By way of another example, the user interface can include a user path representation section that is a visual presentation of where the current webpage in the user path is in terms of subcategories or types of webpages.

The techniques discussed herein maintain user security and anonymity. The web experience augmentation system tracks the webpages accessed by the user during the current web browsing session. The identity of the user need not be known, the user need not establish or log into any account, and the information need not be maintained after the end of the web browsing session. The indication of the webpages accessed by the user during the web browsing session need not be maintained after the end of the web browsing session and thus need not be stored somewhere vulnerable to attack by, or exposure to, malicious users or systems after the end of the web browsing session.

Furthermore, the techniques discussed herein provide a more efficient user interface. During the web browsing session the user is automatically presented with content that he or she is predicted to likely want to view during the web browsing session and thus need not manually navigate to such content.

Additionally, the techniques discussed herein reduce resource usage in the computing device displaying the webpages. By providing the user with content that he or she wants to view during the web browsing session, the amount of time and thus resources expended by the user in searching for the content he or she wants to view is reduced. Various resources are thus conserved, such as processing power, data bandwidth between the computing device and the web server providing the webpages, and power usage by the computing device Example Environment FIG. 1 is an illustration of a web experience augmentation digital medium environment 100 in an example implementation that is operable to employ the web experience augmentation based on local and global content preferences described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The environment 100 also includes a web server 104. Analogous to the computing device 102, the web server 104 may be configured in a variety of ways. The web server 104 is one or more devices that operate to host a website including one or more webpages, and provide those webpages to the computing device 102. Those webpages can then be displayed at the computing device, such as by a web browser 106. In one or more implementations the web server 104 is configured as a server computer, although the web server 104 may be configured as other types of devices (e.g., any of the types of devices discussed above with respect to computing device 102). The web server 104 may be implemented as a single device, or as multiple devices in communication with one another (e.g., via a wired or wireless connection, a network connection, and so forth).

The web server 104 includes a web experience augmentation system 108. The web experience augmentation system 108 is illustrated as being implemented as a standalone system. Additionally or alternatively, the web experience augmentation system 108 can be implemented as part of another system or program.

The web server 104 receives browsing requests 110 from the web browser 106 of the computing device 102. These browsing requests are in response to navigation inputs from a user of the computing device 102 during a web browsing session. In response to the browsing requests 110, the web experience augmentation system 104 predicts one or more webpages that the user is likely to want to view. The web experience augmentation system 108 makes this prediction based on the behavior of the user of the web browser 106 in accessing webpages hosted by the web server 104 during the current browsing session (local content preferences of the user), key performance indicators for the web server 104, and global content preferences. The manner in which the web experience augmentation system 108 makes this prediction is discussed in more detail below.

Given one or more predicted webpages, the web experience augmentation system 108 provides a modified webpage 112 to the web browser 106. The web experience augmentation system 108 generates the modified webpage 112 by adding augmentation data to a webpage hosted by the web server 104. The webpage can be digital content 114 maintained in storage 116 of the web server 104 and is obtained, for example, from the storage 116. The augmentation data can include digital content or an identifier of digital content, such as a title and link to other digital content (e.g., a news article). The augmentation data can be, for example, digital content 114 (e.g., webpages) maintained in the storage 116 of the web server 104 and provided as augmentation data 118, digital content 120 (e.g., webpages) maintained in storage 122 of a data repository 124 and provided as augmentation data 126, digital content (e.g., webpages) obtained from other sources, combinations thereof, and so forth. The data repository 124 can be a storage device (e.g., a network attached storage device) or a computing device (e.g., analogous to the computing device 102 or the web server 104). The web server 104 communicates with the data repository 124 and the computing device 102 via a network 128, such as the Internet. Given this communication via the network 128, the data repository 124 is referred to as being a remote repository and the computing device 102 is referred to as being a remote computing device.

The web experience augmentation system 108 is implemented at least partially in hardware of the computing device 102 to process and transform digital content (e.g., webpages), which are stored in storage 116 of the web server 104. Such processing includes creation of the digital content, modification of the digital content, and transmission of the digital content to the computing device 102, which renders the digital content in a user interface 130 for output, e.g., by a display device 132. The digital content refers to webpages, which can include text data, video data, image data, audio data, and so forth. The storage 116 and 122 can each be any of a variety of different types of storage, such as random access memory (RAM), Flash memory, solid state drive, magnetic disk drive, and so forth.

The web experience augmentation system 108 generates the modified webpage 112, which is displayed by the computing device 102 illustrated as example webpage 134. The web experience augmentation system 108 modified a webpage by adding an identifier of a news article (e.g., a title or caption for the article) to the webpage, illustrated as identifier 136. By displaying the modified webpage 112 including augmentation data (e.g., other webpages) that the user is likely to want to view, the web experience augmentation system 108 is likely to extend the web experience for the user and keep the user on a same website as hosts the webpage to which the user navigated.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Web Experience Augmentation System Architecture

FIG. 2 is an illustration of an example architecture of a web experience augmentation system 108. The web experience augmentation system 108 includes an input module 202, a web session tracking module 204, a webpage representation module 206, an augmentation data prediction module 208, a content augmentation module 210, and an output module 212. The input module 204 receives a web navigation input 220 (a browsing request) from the computing device 102. The web navigation input 220 is an identifier of a webpage that a user requested, via the web browser 106, to navigate to. The user request to navigate to a page can be made in a variety of different manners, such as by entry of a URL of a webpage, selection of a link to a webpage, and so forth. The input module 204 provides the identified webpage 222 to the webpage representation module 206.

The web session tracking module 204 also receives the web navigation input 220. The web session tracking module 204 tracks the webpages accessed during a current web browsing session of a user. Navigation requests can be associated with a particular user of the computing device 102 without knowing the exact identity of the user and without requiring the user to log into an account on the website in a variety of different manners, such as by using cookies (which can optionally be deleted at the end of each web browsing session). In one or more implementations, a web browsing session refers to the time between the web browser 106 being launched and the web browser 106 being terminated. Additionally or alternatively, the web browsing session can refer to different time spans. For example, the web browsing session can begin in response to the web browser 106 being launched or a navigation request received after a threshold amount of time of inactivity (e.g., a threshold amount of time with no user input to the web browser 106). By way of another example, the web browsing session can end in response to the web browser 106 being terminated or, after the web browsing session has begun, after a threshold amount of time of inactivity (e.g., a threshold amount of time with no user input to the web browser 106). E.g., the web browser 106 may be open for an extended period of time (e.g., hours or days) and the web browsing session can begin in response to a navigation request received after a threshold amount of time of inactivity (e.g., 5 minutes), and continue with at least some user interaction with the web browser 106, and the web browsing session can end after another threshold amount of time of inactivity (e.g., 5 minutes).

The web session tracking module 204 maintains a record of the webpages accessed (e.g., visited) during the current web browsing session of the user. The web session tracking module 204 also maintains analytics information regarding each webpage accessed during the current web browsing session of the user. Analytics for a webpage refer to the behavior of visitors to the webpage. Examples of analytics include the number of times the webpage has been viewed, the amount of time spent on the webpage, the number of entries to the webpage, the number of exits from the webpage, the bounce rate for the webpage, and so forth. It should be noted that the analytics information maintained by the web session tracking module 204 refers to the analytics information for the webpage over an extended period of time (e.g., days, weeks, since creation of the webpage) and is not limited to analytics during the current web browsing session of the user. In one or more implementations, the analytics for each webpage are included in a vector of numbers with each number corresponding to a different type of analytics (e.g., the number of times the webpage has been viewed, the amount of time spent on the webpage, etc.).

Webpage representation module 206 generates a webpage representation 224 for the webpage 222. The webpage representation 224 is a succinct representation of the content pieces on webpage 222, effectively a signature that captures the key aspects of the content and optionally the structure of the webpage 222. The webpage representation module 206 can generate the webpage representation 224 in various manners and incorporate various different features of the webpage 222 in the webpage representation 224. Various different techniques can be used to generate various different features that can be appended to one another (e.g., in a vector of numbers format) to create the webpage representation 224.

In one or more implementations, the webpage representation module 206 includes in the webpage representation 224 features generated from a document to vector technique. Document to vector techniques generate a vector of numbers representing text in a document. One example of such a document to vector technique is referred to as doc2vec or paragraph vector and is discussed in "Distributed Representations of Sentences and Documents" by Quoc Le and Tomas Mikolov, *International Conference on Machine Learning*, 1188-1196 (2014), which is hereby incorporated by reference herein in its entirety.

The doc2vec technique is an unsupervised technique or algorithm to represent variable length input text sequences such sentences, paragraphs and documents in the form of fixed size vectors. The doc2vec technique uses a model trained using text content on a set of training webpages to learn the corresponding features. In one or more implementations, for every webpage in the training set, page titles and image captions along with the article text are included.

Special characters, stop words, and hyperlinks are ignored. Data-specific stop words are also ignored using an inverse document frequency measure. This data is then used to train the doc2vec model. The doc2vec model generates a vector (e.g., a 100-dimensional vector) for each webpage.

In one or more implementations, once the webpage representation module 206 is trained the title and image captions along with the article text of the webpage 222 are input to the webpage representation module 206. Special characters, stop words, and hyperlinks are ignored. Data-specific stop words are also ignored using an inverse document frequency measure.

Additionally or alternatively, the webpage representation module 206 includes in the webpage representation 224 features generated from topic modelling techniques. Topic modelling techniques identify features of a word space that capture semantic regularities in language (e.g., on a webpage). One example of such a topic modelling technique is a Gaussian LDA technique discussed in "Gaussian LDA for Topic Models with Word Embeddings" by Rajarshi Das, Manzil Zaheer, and Chris Dyer, *Proceedings of the 53rd Annual Meeting of the Association for Computational Linguistics and the 7th International Joint Conference on Natural Language Processing*, 795-804 (2015), which is hereby incorporated by reference herein in its entirety. The Gaussian LDA technique uses continuous space word vector representations to create topic features of webpages. These features are then included in a vector of numbers. The Gaussian LDA technique is trained using text content on a set of training webpages to learn the corresponding features. In one or more implementations, the set of training webpages is the same training set as is used to train the doc2vec model.

Additionally or alternatively, the webpage representation module 206 includes in the webpage representation 224 analytics features. Analytics features refer to various webpage analytics for the webpage 222. Examples of analytics features include number of times the webpage has been viewed, average amount of time spent on the webpage by users, number of entries to the webpage, number of exits from the webpage, bounce rate for the webpage, and so forth. These analytics features are used to define the historic performance of the webpage over some period of time (e.g., a previous week, a previous month, since inclusion of the webpage on a website, etc.), and are included in a vector of numbers.

Additionally or alternatively, the webpage representation module 206 includes in the webpage representation 224 page level features for the webpage 222. The composition of webpages varies in terms of the type of content pieces present on the webpage. This information is captured using derived page level features, such as the number of images on the webpage, the number of paragraphs on the webpage, the number of videos on the webpage, and so forth. These features are then included in a vector of numbers.

Additionally or alternatively, the webpage representation module 206 includes in the webpage representation 224 URL features for the webpage 222. The webpage representation module 206 parses the URL for the webpage 222 to extract various features regarding the webpage 222. Examples of such features include a category and a subcategory of webpages, within the website hierarchy, that the webpage 222 belongs to. For example, on a sports website a webpage having an article about a professional basketball player may have a URL that indicates the category (e.g., professional basketball) and the subcategory (e.g., the player's name) of the webpage within the website hierarchy. A vector of numbers is then generated that represents these features using a document to vector technique, such as the doc2vec technique discussed above.

Additionally or alternatively, the webpage representation module 206 includes in the webpage representation 224 one or both of image and video features. Various different public or proprietary techniques can be used to analyze an image or a video included on a webpage (or a standalone image or video that is separate from a webpage) and generate one or more features describing the image or video. These features can indicate, for example, subject matter of an image or video, color of an image or video, and so forth. A vector of numbers is then generated that represents these features using a document to vector technique, such as the doc2vec technique discussed above.

By using one or more of these different features to generate the webpage representation 224, the webpage representation module 206 generates a webpage representation that is generic enough to incorporate unseen or new web content that might be introduced to a website. Given the dynamic nature of websites, using these different features allows the webpage representation module 206 to generate an accurate webpage representation despite new content being added to a website.

The augmentation data prediction module 208 receives the webpage representation 224 from the webpage representation module 206. The augmentation data prediction module 208 also receives session history information 226 and webpage analytics 228 from the web session tracking module 204. The webpage analytics 228 are the analytics information regarding each webpage visited in the current web browsing session. The webpage analytics 228 are the analytics information for the webpages over an extended period of time (e.g., days, weeks, since creation of the webpage or inclusion of the webpage on a web site) from multiple (e.g., all) users that accessed the webpages, and are not limited to analytics during the current web browsing session of the user. Accordingly, the webpage analytics are also referred to as global content preferences. These webpage analytics help identify popular navigation paths, high revenue generating topics, stale and irrelevant website content, and so forth.

The web experience augmentation system 108 can use different webpage analytics as discussed above. The particular webpage analytics used can be determined by, for example, the owner or administrator of a website implementing the web experience augmentation system 108. Such an owner or administrator can select webpage analytics that correspond to the one or more key performance indicators (KPIs) that he or she desires. For example, one website owner may be interested in having webpages that have been viewed the most times displayed, so that owner selects as the webpage analytics the number of times the webpage has been viewed. By way of another example, another website owner may be interested in having webpages that users have spent the longest amount of time viewing displayed, so that owner selects as the webpage analytics the amount of time spent on the webpage. The incorporation of analytics allows the augmentation data prediction module 208 to better predict the future content preferences of the users while also catering to various business objectives of the owner or administrator of the website.

The session history information 226 includes an indication of the webpages accessed during the current web browsing session of a user, which are also referred to as historic webpages. The augmentation data prediction module 208 maintains the webpage representations 224 received from the webpage representation module 206, so the augmentation data prediction module 208 has access to the webpage representations for each of the webpages identified in the session history information 226. The session history information 226 is also referred to as the user's local content preferences because the session history information 226 is the webpages accessed during the current web browsing session of the user.

The augmentation data prediction module 208 also receives augmentation data 230. The augmentation data 230 refers to multiple pieces of digital content that can be used to augment the webpage 222, and are also referred to as plausible pieces of augmentation data. In one or more implementations, the augmentation data 230 is one or more webpages (e.g., all the other webpages) that are part of the same website as the webpage 222. Additionally or alternatively, the augmentation data 230 can include one or more additional webpages, such as webpages on other websites (e.g., which partner with the website or are owned by the website that includes the webpage 222). Additionally or alternatively, the augmentation data 230 can include data from other sources, such as user-generated content, data from social media websites, and so forth. Additionally or alternatively, the augmentation data 230 can include various other digital content, such as hyperlinks, video, images, pieces of text, and so forth. Each of these webpages or other data (e.g., user-generated content, video, pieces of text) in the augmentation data 230 is a piece of digital content.

Representations of the augmentation data 230 are also generated. The representation of a piece of digital content in the set of augmentation data 230 is a succinct representation of the piece of digital content, effectively a signature that captures the key aspects of the piece of digital content and optionally the structure of the piece of digital content, such as a vector of numbers. These representations of the pages or data can be generated by the webpage representation module 206 or alternatively another module or system in the same manner, using the same features, as the webpage representations are generated by the webpage representation module 206.

It should be noted that in some situations some features used by the webpage representation module 206 may not be applicable to generating a representation for a piece of digital content. In such situations those features are not included in the representation for the piece of digital content, or are included with a default value (e.g., a value of zero in a vector of numbers). For example, if the piece of digital content is a video, there may not be any document for the doc2vec technique discussed above to generate the vector from text, so the representation for the piece of digital content would not include (or include a default value) for those features. However, other features describing the video may be included in the representation for the piece of digital content.

The augmentation data prediction module 208 uses the webpage representations 224, the session history information 226, the webpage analytics 228, and the augmentation data 230 to generate predicted augmentation data 232. The predicted augmentation data 232 is particular augmentation data (e.g., a particular webpage) from the augmentation data 230 that will be used to augment the webpage 222.

In one or more implementations, the augmentation data prediction module 208 includes a machine learning system, which can be implemented using various different machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

In one or more implementations, the task of generating the predicted augmentation data 232 is modeled as a Markov Decision Process (MDP) with the tuple $(S, \mathcal{A}, \mathcal{P}, \mathcal{R}, \gamma)$. The value $S$ refers to the State space, which captures the current local and global content preferences. The value $\mathcal{A}$ refers to the Action space A, which is the augmentation data (e.g., a set of all webpages on a website). The value $\mathcal{P}$ refers to Transition probabilities, which are the probability p(s'|s, a) moves to state s' by taking an action a in the state s. The value $\mathcal{R}$ refers to capturing the feedback received after taking a particular action. The value $\gamma$ refers to the discount factor for future rewards in the current web browsing session. The goal of the MDP is to learn a policy $\pi: S \rightarrow \mathcal{A}$ to maximize the cumulative reward of the system.

To deal with the large and dynamic action spaces, the augmentation data prediction module 208 uses a Deep Q-Learning model-free approach. Given a state-action pair, the augmentation data prediction module 208 generates the corresponding Q-value Q(s, a). The optimal Q-value Q*(s, a) follows the Bellman equation:

$$Q^*(s, a) = E_{s'}[r + \gamma \max_{a'} Q^*(s', a')|s, a]$$

where r refers to the corresponding reward for the given state-action pair.

Figure 3:
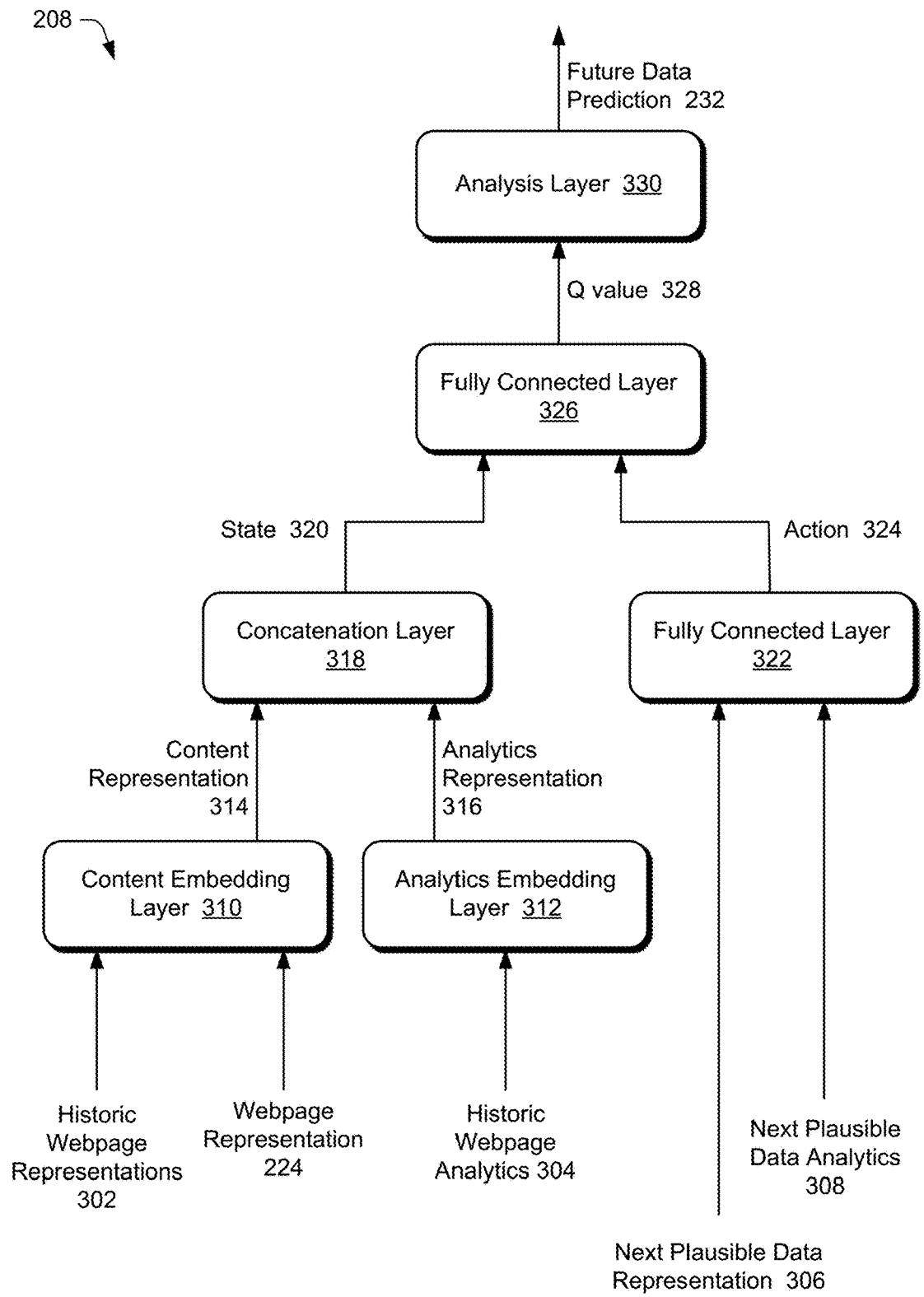
FIG. 3 illustrates an example implementation of the augmentation data prediction module.

FIG. 3 illustrates an example implementation of the augmentation data prediction module 208. The augmentation data prediction module 208 is a neural network based function approximator that, given a state-action pair, generates the corresponding Q-value Q(s, a). The augmentation data prediction module 208 receives historic webpage representations 302, webpage representation 224, historic webpage analytics 304, next plausible data representation 306, and next plausible data analytics 308. The historic webpage representations 302 are the representations of the webpages identified in the session history information 226. The historic webpage analytics 304 are the webpage analytics 228 for the webpages identified in the session history information 226. The next plausible data representation 306 is the representation for particular augmentation data 230 (e.g., a particular webpage). The next plausible data analytics 308 are the analytics for the particular augmentation data 230 (e.g., a particular webpage).

Generally, the augmentation data prediction module 208 receives the next plausible data representation 306 and the next plausible data analytics 308 for each of multiple pieces of augmentation data 230 (e.g., for each of multiple webpages). A Q value is generated for each piece of augmentation data 230 (e.g., each webpage, social media post, etc.), the Q value indicating how likely the piece of augmentation data 230 is to be the next data desired by the user (e.g., the next webpage the user would like to view) in light of the local and global content preferences. The Q values for the multiple pieces of the augmentation data 230 are compared, and the piece of the augmentation data 230 having the best (e.g., the highest) Q value is selected as the predicted augmentation data.

The augmentation data prediction module 208 includes a content embedding layer 310 and an analytics embedding layer 312. The content embedding layer 310 receives as input the historic webpage representations 302, which are the webpage representations generated by the webpage representation module 206 for each webpage accessed in the current web browsing session, as well as the webpage representation 224. The content embedding layer 310 generates a content representation 314 that is a representation of the content of the sequence of webpages that have been accessed in the current web browsing session, including the current webpage being accessed (as indicated by webpage representation 224).

In one or more implementations, the content embedding layer 310 is a recurrent neural network. Recurrent neural networks recognize patterns in sequences of data. The content embedding layer 310 can be, for example a long short-term memory (LSTM) layer that is a recurrent neural network that includes LSTM units that are formed of cells, input gates, output gates, and forget gates. The content embedding layer 310 is trained to generate a content representation of a sequence of webpages as discussed in more detail below. Once trained, the sequence of webpage representations of the webpages that have been accessed in the current web browsing session are input to the LSTM layer, which generates the content representation 314.

Additionally or alternatively, the content embedding layer 310 can be implemented as any of a variety of different types of recurrent neural networks. For example, the content embedding layer 310 can be implemented as a gated recurrent unit (GRU) neural network, a neural turing machine (NTM) network, a recursive neural network, and so forth.

The analytics embedding layer 312 receives as input the historic webpage analytics 304, which are the analytics information for each webpage accessed in the current web browsing session. The analytics embedding layer 312 generates an analytics representation 316 that is a representation of the analytics of the sequence of webpages that have been accessed in the current web browsing session.

In one or more implementations, the analytics embedding layer 312 is a recurrent neural network, such as an LSTM layer. The analytics embedding layer 312 is trained to generate an analytics representation of a sequence of webpages as discussed in more detail below. Once trained, the sequence of analytics of the webpages that have been accessed in the current web browsing session are input to the LSTM layer, which generates the analytics representation 316.

Additionally or alternatively, the analytics embedding layer 312 can be implemented as any of a variety of different types of recurrent neural networks. For example, the analytics embedding layer 312 can be implemented as a GRU neural network, an NTM network, a recursive neural network, and so forth.

The content representation 314 and the analytics representation 316 are input to a concatenation layer 318. The concatenation layer 318 generates a current state 320 for the augmentation data prediction module 208 by concatenating the content representation 314 and the analytics representation 316.

The augmentation data prediction module 208 also includes a fully connected layer 322. The fully connected layer 322 generates an action 324 based on the input next plausible data representation 306 for a particular piece of augmentation data 230 and next plausible data analytics 308 for the particular piece of augmentation data 230. The action represents the user viewing or browsing to that particular piece of augmentation data. The fully connected layer 322 is trained to generate an action as discussed in more detail below.

The state 320 and the action 324 are a state-action pair and are input into a fully connected layer 326. The fully connected layer 326 generates a Q value 328 indicating how likely the particular piece of augmentation data is to be the next data desired by the user in light of the local and global content preferences. The fully connected layer 326 is trained to generate a Q value as discussed in more detail below. For each of one or more pieces of augmentation data, the representation of the piece of augmentation data and the analytics for the piece of augmentation data are input to the fully connected layer 322. The same state 320 is used for each such piece of augmentation data, resulting in multiple Q values being generated by the fully connected layer 326 (one Q value for each piece of augmentation data).

The Q values 328 for multiple pieces of the augmentation data 230 are input to the analysis layer 330. The analysis layer 330 compares the Q values 328 for the different pieces of the augmentation data 230 and identifies the piece of augmentation data 230 having the best (e.g., the highest) Q value as the predicted augmentation data 232. Because the Q values are generated based on the local content preferences and global preferences, as well as the next plausible data representations and the next plausible data analytics, generation of the Q values accounts for the local content preferences and global preferences, as well as the next plausible data representations and the next plausible data analytics.

The augmentation data prediction module 208 is trained using a set of training data. The training data includes a log of webpage accesses to a website for multiple different web browsing sessions. This log identifies, for each web browsing session, the webpages accessed during the session as well as the order in which the webpages were accessed. The training data also includes an action space which includes all of the augmentation data for the website (e.g., all of the webpages on the website). The training data also includes the analytics for the webpages on the website as well as for any additional augmentation data.

To train the augmentation data prediction module 208, a current state of the web browsing session (the current webpage the user is viewing) is determined. For the current state, the training data is used to select, as the predicted augmentation data 232, a piece of augmentation data 230 having the best (e.g., the highest) Q value. This predicted augmentation data 232 is compared to the actual next webpage accessed by the user (as indicated in the log of webpage accesses) and a loss function is used to determine a loss between the predicted augmentation data 232 and the actual next webpage accessed by the user. Weights of nodes in the layers of the augmentation data prediction module 208 (e.g., layers 310, 312, 318, 322, and 326) are then updated to minimize this loss function.

In one or more implementations, the loss function is:

$$\left(\left(r + \gamma \max_{a'} Q_T(s', a'; \theta)\right) - Q_M(s, a; \theta)\right)^2$$

where r refers to the corresponding reward for the given state-action pair (s, a), γ refers to a discount factor for future rewards in the current web browsing session, $Q_T$ refers to a target augmentation data prediction module with weights θ assigned to the various nodes in the layers, s' refers to a next state (e.g., the next webpage the user will view), a' refers to an action taken to transition to the next state (e.g., a next webpage to be selected for viewing), $Q_M$ refers to the augmentation data prediction module with weights θ assigned to the various nodes in the layers, s refers to a current state (the current webpage the user is viewing), and a refers to an action to take to transition to the next state (e.g., a next webpage to be selected for viewing).

The reward r for a given state-action pair (s, a), also referred to as r(s, a) is a combination of prediction and analytics. At each timestep (e.g., each transition from one state to another), a reward is received from the user based on the action chosen in the state s. In one or more implementations, the reward is:

$$r(s, a) = r_P(s, a) + (r_A^1(a) + r_A^2(a) + r_A^3(a) \ldots + r_A^k(a))$$

where $r_P(s, a)$ refers to the prediction reward (whether the corresponding webpage was in fact the next webpage viewed by the user) and $r_A^i(a)$ refers to the analytics reward of the action a with respect to KPI i. These rewards can be set to various values. For example, the prediction reward can be set to 3, and the analytics reward is set to the total change in the KPI value (e.g., in the analytics value) over a preceding particular time interval (e.g., 250 seconds). By way of another example, the analytics reward can be set to maximize a particular KPI, resulting in the augmentation data prediction module 208 being trained to generate predicted augmentation data 232 that heavily favors that particular KPI. To do so, the analytics reward can be set to a higher value if predicted page has a high value for that KPI (e.g., greater than a threshold number of visits, such as 10,000) and to a lower value if the webpage corresponding to the action a has a low value for that KPI (e.g., less than the threshold number of visits).

Table I includes pseudocode for an example process that can be used to train the augmentation data prediction module 208 (referred to as the Q-value model $Q_M(s, a)$).

TABLE I

```
1:   Initialize replay memory M
2:   Initialize Q-value model Q_M(s, a) with random weights
3:   Initialize target model Q_T(s, a) with same weights as Q_M(s, a)
4:   Initialize webpage (action) pool P
5:   Initialize webpage analytics A (action, KPI, time interval)
6:   for e = 1,E do
7:     Reset environment state vector to a zero vector
8:     for t= 1,T do
9:       Observe the current state s_t
10:      for n = 1,N do
11:        Sample a negative action a from pool P
12:        Observe the next state s_{t+1}, reward r
13:        Store transition (s_t, a, r, s_{t+1}, done=1) in M
14:      end for
15:      Get the correct action a from the offline logs
16:      Observe the next state s_{t+1}, reward r
17:      Set done=1 if t== T, else 0
18:      Store transition (s_t, a, r, s_{t+1}, done=done) in M
19:      Update s_t ← s_{t+1}
20:      if M.length > batch-size then
21:        Sample a minibatch of transitions from M
```

22:
$$\text{Set } y = \begin{cases} r, & \text{done} = 1 \\ r + \gamma \max_{a'} Q_T(s', a'; \theta), & \text{done} = 0 \end{cases}$$

```
23:        Minimize (y − Q_M(s, a; θ))^2
24:      end if
25:    end for
26:    Update webpage pool P and webpage analytics A.
27:    Update target model after fixed number of iterations
28:  end for
```

In lines 1-5 the models, action pool (e.g., webpages or other augmentation data), and webpage analytics are initialized. Lines 6 and 28 indicate that the following process is repeated for each of multiple web browsing sessions (also referred to as episodes E). Lines 8-25 indicate the actions taken for each timestep in the current web browsing session (which has a total of T timesteps). Each timestep refers to some action being performed (e.g., transitioning from one state to another).

At lines 10-14, multiple (N) negative actions from the action pool are selected. These negative actions refer to one of the actions that is not the action that was in fact taken based on the training data. Negative actions can be selected randomly, pseudorandomly, based on various rules or criteria, and so forth. The value of N may be, for example, 2. Transition data for each negative action is stored, including the state $s_t$, the negative action a, the reward r for the action, the next state $s_{t+1}$, and an indication that the action web browsing session has ended (done=1). Negative actions are selected because the training data only contains positive samples for next-page prediction. Moreover, selecting negative actions allows the analytics values of webpages beyond those seen in the current web browsing session to be explored.

At lines 15-19, the correct action is identified (the action that was in fact taken based on the training data). Transition data for the correct action is stored, including the state $s_t$, the action a, the reward r for the action, the next state $s_{t+1}$, and an indication that either the web browsing session has ended (done=1) or has not ended (done=0). The next state $s_{t+1}$ becomes the new current state $s_t$.

At lines 20-24 a batch of stored transitions is analyzed in response to the number of stored transitions exceeding a value batch-size (a threshold value, such as 16). A particular number (e.g., 4) of the stored transitions are selected. For each stored transition, a value y is generated that is either the reward r if done=1, or the value $$r + \gamma \max_{a'} Q_T(s', a'; \theta)$$

if done=0. These values of y are then used to minimize the loss function.

At line 26, after each web browsing session has ended, the action pool P and the webpage analytics A are updated. At line 27, after a threshold number of iterations (e.g., 1000) of the for loop in lines 8-25 have been performed, the weights in the target model $Q_T(s, a)$ are updated. After the process in Table I has been completed, the final target model $Q_T(s, a)$ is the trained augmentation data prediction module.

In one or more implementations, training using a first threshold number of webpages (e.g., 3) in the web browsing session is skipped. Accordingly, transition data for the first threshold number of transitions from one webpage to another in a web browsing session is not stored in M. This is because the first threshold number of webpages are inadequate to provide enough context to predict the future data.

As an example, in one or more implementations of the process in Table I, the batch size is 16 throughout, along with a learning rate for Adam optimizer as 0.01. The number of negative action samples is 2, the interval size is 5 seconds, the size of replay the buffer is 5000 transitions, and γ=0 to predict only the immediate reward at every timestep. The weights are transferred to the target network after every 1000 replay iterations. The prediction reward is set to 3 for correct prediction and 0 otherwise, while the analytics reward is fixed to the total change in KPI value over the past 50 intervals.

Returning to FIG. 2, the augmentation data prediction module 208 provides the predicted augmentation data 232 to the content augmentation module 210. The content augmentation module 210 modifies the webpage 222 to include the predicted augmentation data 232. The modified webpage 234 is provided to the output module 212, which causes the modified webpage 234 to be communicated to the computing device 102.

Including the predicted augmentation data on the webpage 222 can be performed in different manners, such as adding the augmentation data itself to the webpage 222, adding a link to the augmentation data on the webpage 222, and so forth. The content augmentation module 210 can include the predicted augmentation data on the webpage 222 in a variety of different manners. In one or more implementations, the webpage 222 includes both static and dynamic elements, and at least one of those dynamic elements is used as the location where the predicted augmentation data is situated. The location of such a dynamic element varies and is determined by the webpage developer or designer.

Additionally or alternatively, the content augmentation module 210 can add the predicted augmentation data at a particular (e.g., default) location of the webpage 222. For example, the content augmentation module 210 can add the predicted augmentation data to the end (bottom) of the webpage 222.

Additionally or alternatively, the content augmentation module 210 can replace content on the webpage 222 with the predicted augmentation data. For example, the webpage 222 may include multiple different hyperlinks to other webpages, and the content augmentation module 210 can replace one of those hyperlinks with a link to the predicted augmentation data.

In situations in which content augmentation module 210 replaces content on the webpage 222 with the predicted augmentation data, the content augmentation module 210 can use various different rules or criteria to determine which content to replace. In one or more implementations, the content augmentation module 210 uses analytics to generate a score for each piece of content (e.g., each hyperlink to a webpage) on the webpage 222, and replaces the piece of content having the lowest score with the predicted augmentation data. The content augmentation module 210 can use any of a variety of analytics, such as any of the analytics discussed above. A single analytic can be used. For example, the content augmentation module 210 can assign a score to a hyperlink to a webpage that is the number of times the webpage has been viewed. The content augmentation module 210 can also combine multiple analytics. For example, a first metric (e.g., the amount of time spent on the webpage) can be multiplied by a first weight, a second metric (e.g., the number of entries to the webpage) can be multiplied by a second weight, and these two products can be averaged together to generate the score for a hyperlink to a webpage.

Figure 4:
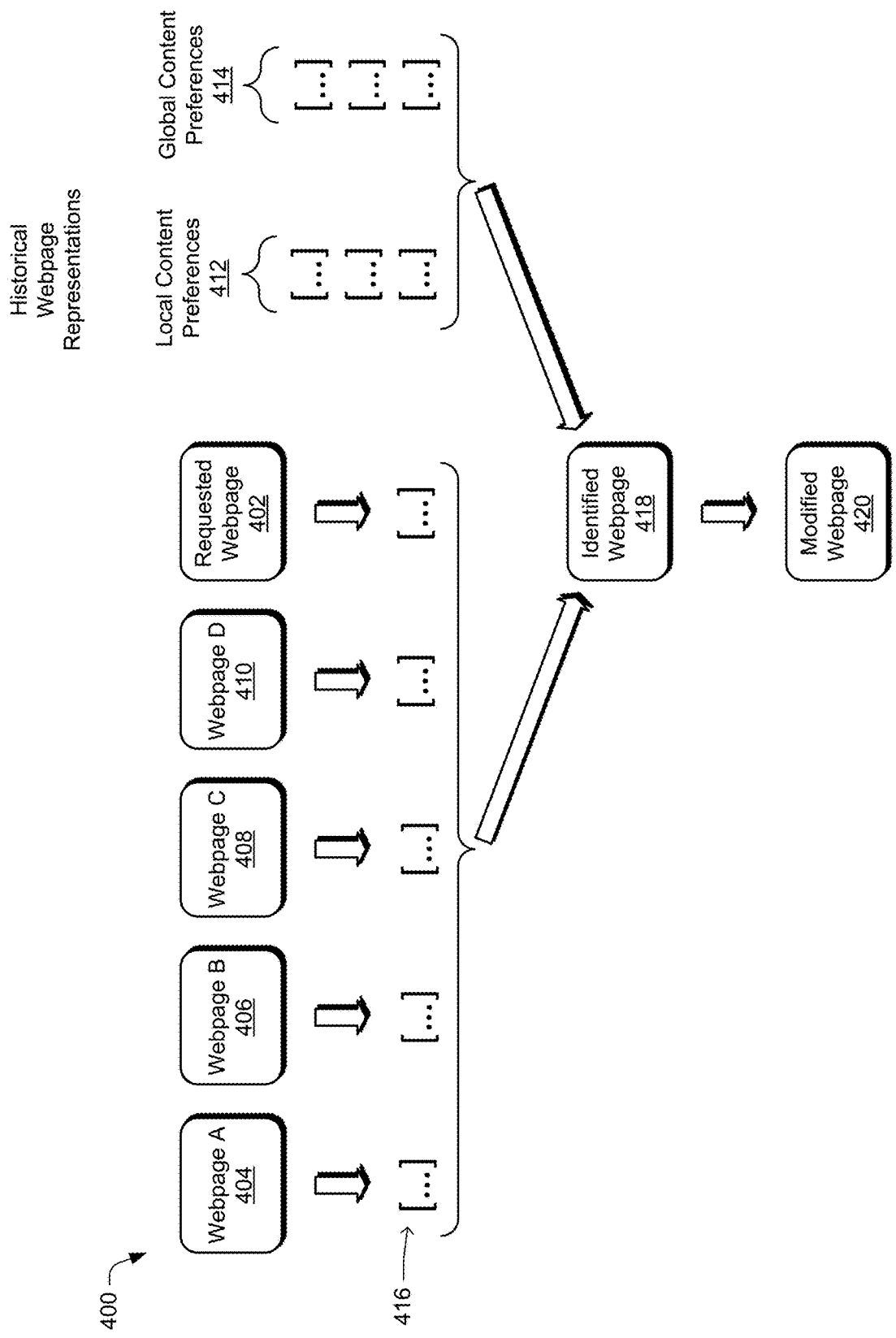
FIG. 4 illustrates an example of generating a modified webpage including augmentation data.

FIG. 4 illustrates an example 400 of generating a modified webpage including augmentation data. A requested webpage 402 is illustrated, which is a webpage that a user has requested to navigate to via a web browser. Multiple plausible pieces of augmentation data are illustrated as webpage 404, webpage 406, webpage 408, and webpage 410. Although only four plausible pieces of augmentation data are illustrated, it should be noted that there can be any number of plausible pieces of augmentation data.

The requested webpage 402 is obtained but is not communicated to the web browser until modified by the web experience augmentation system. Local content preferences 412 and global content preferences 414 are also obtained. The local content preferences 412 refer to representations of webpages (vectors of numbers shown as "[ . . . ]") in the navigation path that the user has taken during the current web browsing session. The global content preferences 414 refer to webpage analytics for each of the webpages in the navigation path that the user has taken during the current web browsing session (vectors of numbers shown as "[ . . . ]"). In the illustrated example, the global content preferences also include webpage analytics for each of the webpages 404, 406, 408, and 410, and optionally the requested webpage 402.

Representations 416 of the requested webpage 402 as well as each of the webpages 404, 406, 408, and 410 is generated. These representations 416 are illustrated as vectors of numbers, each vector of numbers being shown as "[ . . . ]". A webpage 418 is identified based on these representations 416, the local content preferences 412, and the global content preferences 414. As discussed above, the webpage 418 is identified by generating a value or score for each of the webpages 404, 406, 408, and 410. The one of the webpages 404, 406, 408, and 410 having the best (e.g., highest) score is the identified webpage 418.

The requested webpage 402 is modified to include as augmentation data the identified webpage 418, resulting in the modified webpage 420. The modified webpage 420 is then caused to be communicated to the web browser where the modified webpage 420 can be displayed to the user. It should be noted that the modified webpage 420 is caused to be communicated to the web browser rather than the requested webpage 402.

Figure 5:
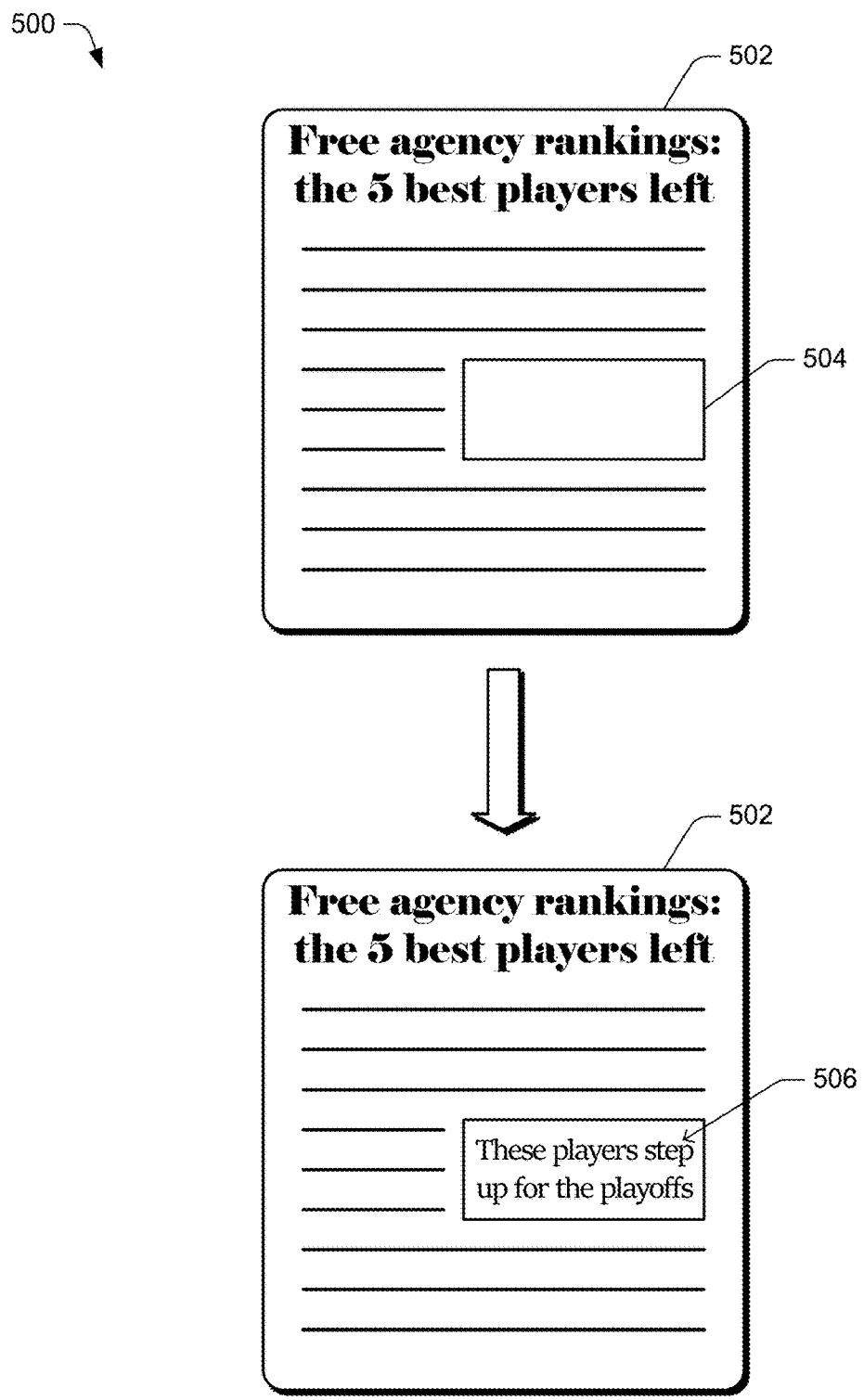
FIG. 5 illustrates an example of modifying a webpage to include augmentation data.

FIG. 5 illustrates an example 500 of modifying a webpage to include augmentation data. A webpage 502 is illustrated having a dynamic element 504 that is empty. The content augmentation module 210 adds a hyperlink to the future predicted page, illustrated as hyperlink 506 to a news article titled "These players step up for the playoffs".

Figure 6:
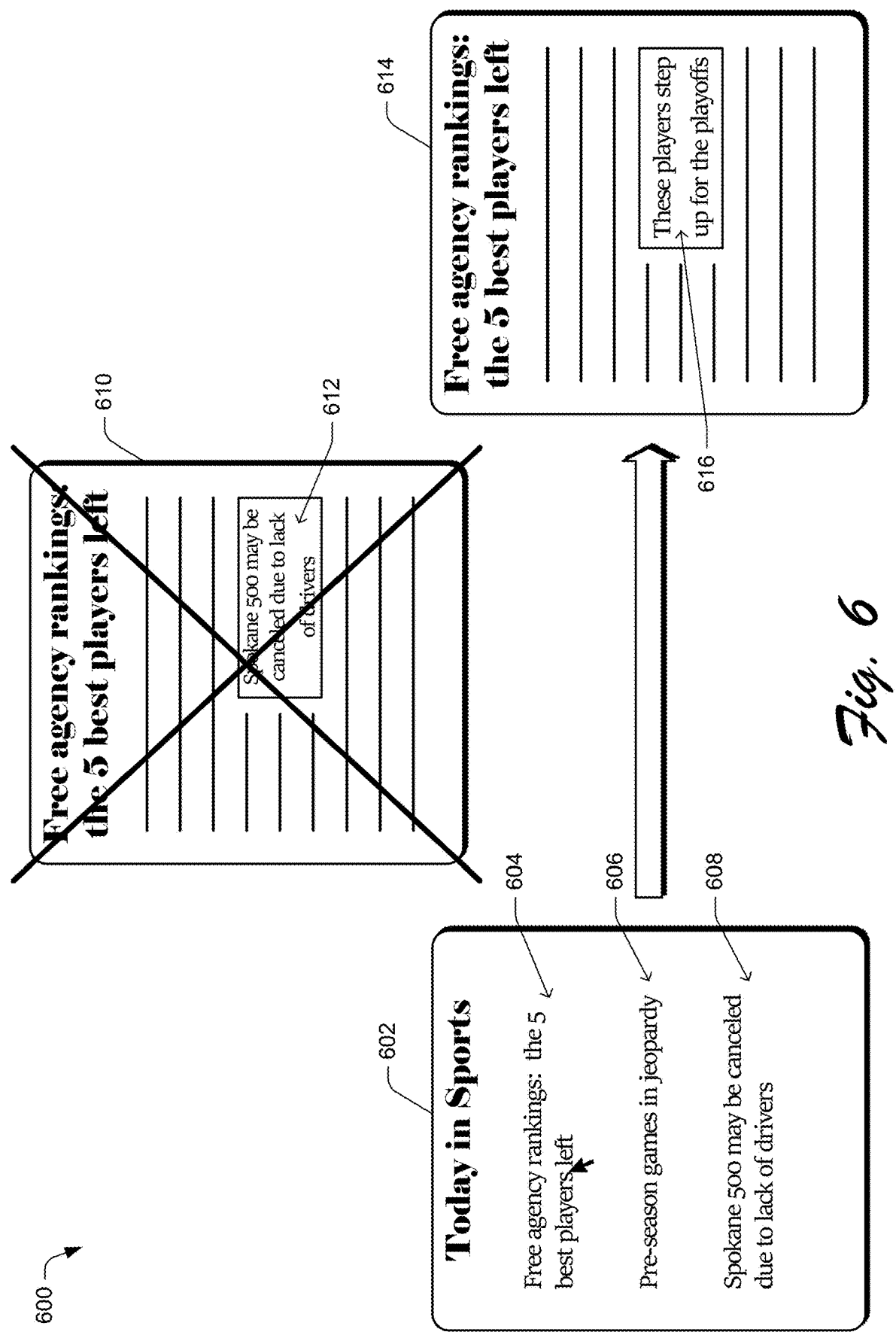
FIG. 6 illustrates another example of modifying a webpage to include augmentation data.

FIG. 6 illustrates another example 600 of modifying a webpage to include augmentation data. A webpage 602 is illustrated having hyperlinks 604, 606, and 608, each being a hyperlink to a different webpage. The user selects hyperlink 604, which is a hyperlink to webpage 610 that includes a hyperlink 612 to a news article titled "Spokane 500 may be canceled due to lack of drivers". However, the content augmentation module 210 generates a modified webpage 614 by replacing the hyperlink 612 with a hyperlink 616 to an article titled "These players step up for the playoffs". The modified webpage 614 rather than the webpage 610 is then communicated to the computing device 102.

Returning to FIG. 2, it should be noted that the discussions herein refer to generating a single piece of digital content (e.g., a single webpage, a single social media post) as predicted augmentation data 232 for the webpage 222. However, in other implementations multiple pieces of digital content can be predicted augmentation data 232 for the webpage 222. For example, the analysis layer 330 can select the multiple pieces of augmentation data 230 having the best (e.g., the highest) Q values as the multiple pieces of predicted augmentation data 232. This allows the content augmentation module 210 to include multiple pieces of predicted augmentation data on the webpage 222. For example, the content augmentation module 210 can generate a score for each piece of content (e.g., each hyperlink to a webpage) on the webpage 222, and replace the multiple pieces of content having the lowest scores with the multiple predicted augmentation data.

Figure 7:
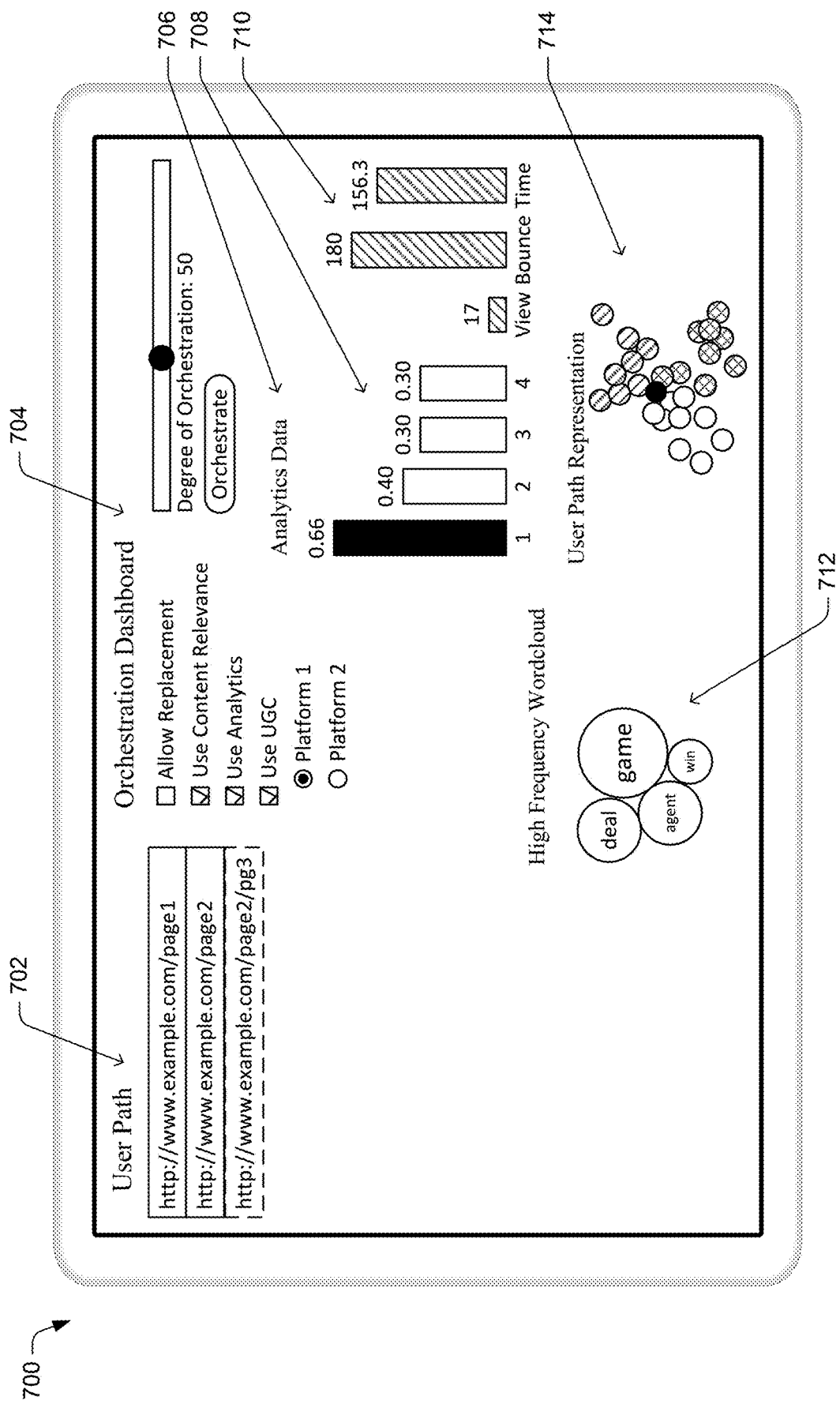
FIG. 7 illustrates an example user interface for the web experience augmentation system.

FIG. 7 illustrates an example user interface 700 for the web experience augmentation system. The user interface 700 is presented by the web experience augmentation system 108, and can be displayed at the web server 104 or at a remote computing device. The user interface 700 allows a person, such as a website developer or administrator, to set various configuration parameters for the web experience augmentation system 108 on that website as well as receive feedback regarding how the web experience augmentation system 108 is operating. Although discussed here with reference to a website administrator, it should be noted that various other individuals can use the user interface 700.

The user interface 700 includes a user path section 702 that identifies the path on the website that the user has taken. URLs that the user has taken are displayed in one format (e.g., surrounded by a solid box or in black) and the URL of the predicted augmentation data is displayed in a different format (e.g., surrounded by a dashed box or in red).

The user interface 700 also includes an orchestration dashboard section 704 that allows the administrator to configure various aspects of the web experience augmentation system 108. The orchestration dashboard section 704 includes check boxes allowing the administrator to allow or disallow content replacement (e.g., if allowed then the content augmentation module 210 replaces content on a webpage with the augmentation data, but if disallowed then the content augmentation module 210 adds augmentation data to the webpage without replacing any content on the webpage). The check boxes further allow the administrator to select whether to use content relevance (e.g., local content preferences) in determining augmentation data, whether to use analytics (e.g., global content preferences) in determining augmentation data, and whether augmentation data can be user-generated content (UGC). If the augmentation data can be user-generated content, then further check boxes allow the administrator to select which platforms or websites (data repositories) the augmentation data can be received from. For example, these platforms or websites can be social media websites, messaging or blogging websites, and so forth.

The orchestration dashboard section 704 also includes a slider in the form of a bar and circle that the administrator can use to change the degree of orchestration. The degree of orchestration indicates how many pieces of content on a webpage can be replaced or how many pieces of augmentation data can be added to the webpage. Higher values for the degree of orchestration allow more pieces of content on a webpage to be replaced or more pieces of augmentation data to be added to the webpage than lower values. An "Orchestrate" button is also included to allow the administrator to have the content augmentation module 210 replace pieces of content or add alignment guide in accordance with the selected degree of orchestration.

The user interface 700 also includes an analytics data section 706 that displays various analytics information. A first portion 708 is a bar chart that represents future augmentation data being predicted by the web experience augmentation system 108. Each bar represents a Q value for particular augmentation data (e.g., a Q value of 0.66 for augmentation data "1"). A second portion 710 is a bar chart that illustrate particular values for KPIs for the selected augmentation data (e.g., the augmentation data corresponding to the blacked-in bar in portion 708). For example, the portion 710 illustrates the number of views ("view"), the bounce rate ("bounce"), and the time spent viewing ("time") KPIs for the augmentation data "1".

The user interface 700 also includes a high frequency wordcloud section 712 that is a representation of the content that the user has seen so far during the web browsing session. The high frequency wordcloud section 712 is the top words and topics in the content represented visually. These top words and topics are generated, for example, by the webpage representation module 206. The size of each circle represents the number of times that particular word or topic has occurred during the web browsing session. For example, the word "game" has been occurred more frequently than the word "win".

The user interface 700 also includes a user path representation section 714 that is a visual presentation of where the current webpage in the user path is in terms of subcategories or types of webpages. For example, the current webpage is displayed in one format (e.g., filled in or in green), webpages on the website that fall within one subcategory or type are displayed in another format (e.g., empty or in orange), webpages on the website that fall within another subcategory or type are displayed in another format (e.g., cross-hatched or in blue), and webpages on the website that fall within yet another subcategory or type are displayed in another format (e.g., angled-line fill or in grey).

It should be noted that the user interface 700 is an example, and that the user interface for the web experience augmentation system need not include all of the information displayed in FIG. 7. For example, a user interface for the web experience augmentation system may display the orchestration dashboard section 704 that allows the administrator to configure various aspects of the web experience augmentation system 108, but may not display the other sections displaying feedback regarding how the web experience augmentation system is operating (e.g., user path section 702, analytics data section 706, high frequency wordcloud section 712, and user path representation section 714).

The techniques discussed herein allow a website to be customized to a particular user during a web browsing session based on the webpages they have already accessed during the web browsing session. For example, a finance website may have different sections, one for credit cards, another for bank savings account, another for mortgages, and so forth. A user might be looking to buy a house and navigating through the various sections and webpages can be tedious if the content is not well organized. However, using the techniques discussed herein, an adaptive web experience is generated for the user based on his or her current needs. Thus, a user looking for home loan related information will have different a set of webpages served than a user just looking to set up a bank saving account or apply for a car loan.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-7.

Figure 8:
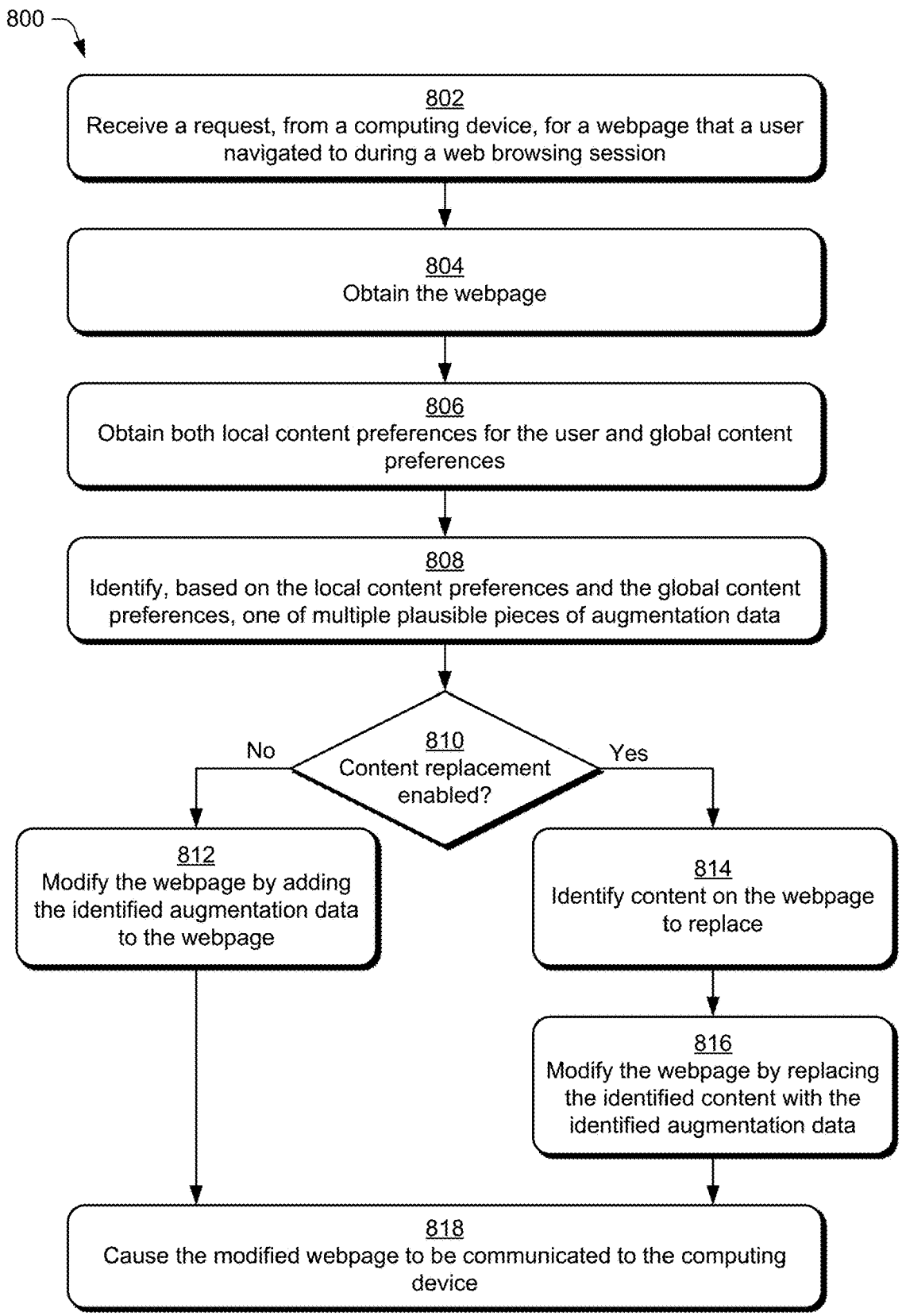
FIG. 8 is a flow diagram depicting a procedure in an example implementation of web experience augmentation based on local and global content preferences described herein.

FIG. 8 is a flow diagram depicting a procedure 800 in an example implementation of web experience augmentation based on local and global content preferences described herein. In this example, a request is received, from a computing device, for a webpage that a user navigated to during a web browsing session (block 802). The computing device is, for example, a remote computing device. The user can have navigated to the webpage in any of a variety of manners as discussed above.

In response to the request, the webpage is obtained (block 804). The webpage is obtained, for example, by retrieving the webpage from a store on the web server that received the request.

Both local content preferences for the user and global content prefers are obtained (block 806). As discussed above, the local content preferences for the user refer to an indication of the webpages accessed during the current web browsing session of the user, and the global content preferences refer to analytics for webpages on a website obtained over an extended period of time that extends prior to the web browsing session of the user.

One of multiple plausible pieces of augmentation data are identified based on the local content preferences of the user and the global content preferences (block 808). Each plausible piece of augmentation data is digital content that can be used to modify the webpage that the user navigated to. A value or score is assigned to each plausible piece of augmentation data and the plausible piece of augmentation data having the best (e.g., highest) score generated is identified in block 808.

A determination is made whether content replacement for the webpage is enabled (block 810). Content replacement can be enabled or disabled in various manners, such as based on an input provided to a user interface presented by the web experience augmentation system, based on an indication in the webpage or metadata associated with the webpage, based on a global setting for a website hosting the webpage, and so forth.

In response to content replacement for the webpage being disabled, the webpage is modified by adding the identified augmentation data to the webpage (block 812). The augmentation data can be added, for example, at a location specified by a dynamic element in the webpage. The identified augmentation data is the augmentation data identified in block 808.

The modified webpage is then caused to be communicated to the computing device in place of the obtained webpage (block 818). The modified webpage can be caused to be communicated to the computing device in various manners, such as by invoking various software, firmware, or hardware functionality to communicate the modified webpage to the computing device across a network.

Returning to block 810, in response to content replacement for the webpage being enabled, content on the webpage to replace is identified (block 814). The content on the webpage to replace can be identified in various manners, such as by using various analytics to generate a score for each piece of content on the webpage (e.g., each hyperlink to a webpage), and selecting the piece of content having the lowest score.

The webpage is modified by replacing the identified content on the webpage with the identified augmentation data (block 816). The identified augmentation data is the augmentation data identified in block 808. The modified webpage is then caused to be communicated to the computing device in place of the obtained webpage (block 818).

Example System and Device

Figure 9:
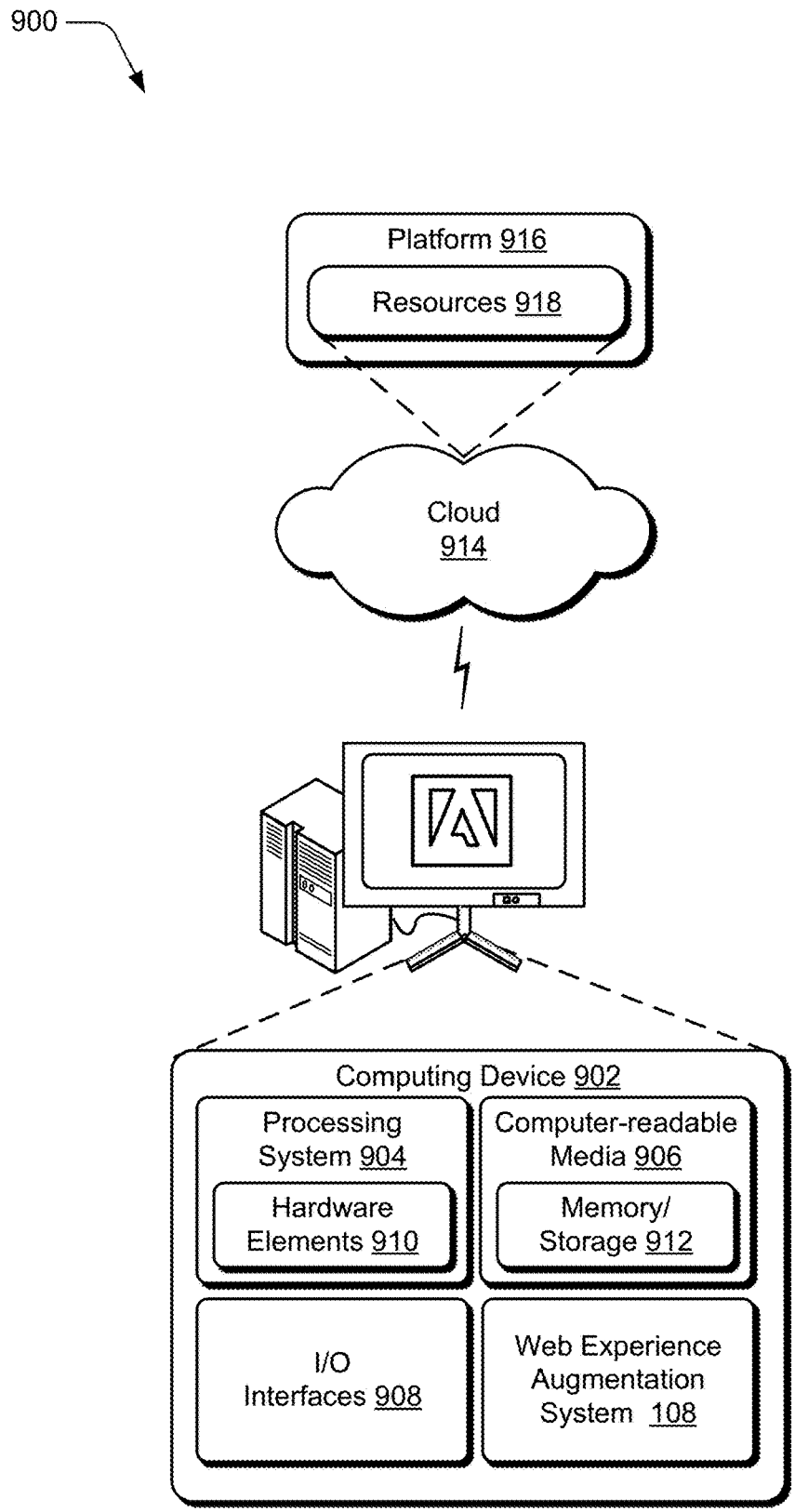
FIG. 9 illustrates an example system including various components of an example device that can be implemented as any type of computing device as described and/or utilize with reference to FIGS. 1-8 to implement aspects of the techniques described herein.

FIG. 9 illustrates an example system generally at 900 that includes an example computing device 902 that is representative of one or more computing systems and/or devices that may implement the various techniques described herein. This is illustrated through inclusion of the web experience augmentation system 108. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a web experience augmentation digital medium environment, a method implemented by at least one computing device, the method comprising:
    receiving, from a computing device, a request for a first webpage that a user navigated to during a web browsing session;
    obtaining the first webpage;
    obtaining both local content preferences for the user and global content preferences, the local content preferences including a navigation path through multiple webpages that the user has taken during the web browsing session, the global content preferences including, for each of the multiple webpages in the navigation path, webpage analytics from multiple users that accessed the webpage;

identifying, by an augmentation data prediction module, first augmentation data that is one of multiple plausible pieces of augmentation data, the augmentation data prediction module receiving as inputs the local content preferences and the global content preferences rather than navigation paths through multiple web pages that the user took during previous web browsing sessions, the augmentation data prediction module including a machine learning system having been trained to identify the one of multiple plausible pieces of augmentation data based on content representations for training navigation paths, analytics representations for the training navigation paths, data representations for training pieces of augmentation data, and data analytics for the training pieces of augmentation data;

determining whether content replacement for the first webpage is enabled;

modifying the first webpage to include the first augmentation data, resulting in a modified webpage, the modifying including:
  in response to content replacement for the first webpage not being enabled, adding the first augmentation data to the first webpage, and
  in response to content replacement for the first webpage being enabled, identifying content on the first web page and replacing the content on the first webpage with the first augmentation data; and causing the modified webpage to be communicated to the computing device in place of the first webpage.

2. The method as recited in claim 1, the first augmentation data comprising a second webpage.

3. The method as recited in claim 1, the global content preferences including, for each of the multiple webpages in the navigation path, webpage analytics from during the web browsing session and webpage analytics from the multiple users that accessed the webpage.

4. The method as recited in claim 1, further comprising generating a content representation for the navigation path based on the multiple webpages in the navigation path, and the identifying being based on the content representation for the navigation path.

5. The method as recited in claim 4, further comprising generating an analytics representation for the navigation path based on the analytics of the multiple webpages in the navigation path, and the identifying being based on the analytics representation for the navigation path.

6. The method as recited in claim 5, the generating the content representation for the navigation path comprising generating the content representation using a first long-short term memory network having as inputs representations of the multiple webpages in the navigation path and a representation of the first webpage, and the generating the analytics representation for the navigation path comprising generating the analytics representation using a second long-short term memory network having as inputs the analytics of the multiple webpages in the navigation path.

7. The method as recited in claim 6, further comprising:
generating, for each of the multiple plausible pieces of augmentation data, a data representation of the plausible piece of augmentation data;
determining, for each of the multiple plausible pieces of augmentation data, a value based on the content representation for the navigation path, the analytics representation for the navigation path, the data representation for the plausible piece of augmentation data, and data analytics for the plausible piece of augmentation data, the value being determined using a fully connected layer that receives as inputs the content representation from the first long-short term memory network, the analytics representation from the second long-short term memory network, and a representation of the plausible piece of augmentation data generated from the data representation for the plausible piece of augmentation data and the data analytics for the plausible piece of augmentation data, wherein the fully connected layer is trained to generate values for particular pieces of augmentation data based on content representations from the first long-short term memory network, analytics representations from the second long-short term memory network, and representations of plausible pieces of augmentation data; and
the identifying comprising selecting one of the multiple plausible pieces of augmentation data having a highest value as the first augmentation data.

8. The method as recited in claim 1, the identifying comprising identifying as the first augmentation data a webpage that is likely to extend the web experience and keep the user on a same website as hosts the first webpage.

9. The method as recited in claim 1, the multiple pieces of augmentation data including one or more pieces of augmentation data from a social media website identified by an administrator via input to a user interface allowing the administrator to select which social media websites augmentation data can be received from.

10. The method as recited in claim 1, further comprising:
identifying one or more additional ones of the multiple plausible pieces of augmentation data; and
modifying the first webpage to include as augmentation data the identified one or more additional ones of the multiple plausible pieces of augmentation data, resulting in the modified webpage, a total number of pieces of augmentation data to be included in the modified webpage having been identified by an administrator via input to a user interface allowing the administrator to select how many pieces of augmentation data can be added to the first webpage.

11. In a web experience augmentation digital medium environment, a computing device comprising:
a processor; and
computer-readable storage media having stored thereon multiple instructions that, responsive to execution by the processor, cause the processor to perform operations including:
  receiving, from a remote computing device, during a web browsing session a request for a first webpage on a website that a user navigated to during the web browsing session;
  obtaining local content preferences for the user, the local content preferences including a navigation path through multiple webpages that the user has taken during the web browsing session;
  obtaining global content preferences for the multiple webpages, the global content preferences including, for each of the multiple webpages in the navigation path, webpage analytics from multiple users that accessed the webpage;
  identifying, by an augmentation data prediction module, first augmentation data that is one of multiple plausible pieces of augmentation data, the augmentation data prediction module receiving as inputs the local content preferences and the global content preferences rather than navigation paths through multiple web pages that the user took during previous web browsing sessions, the augmentation data prediction module including a machine learning system having been trained to identify the augmentation data for the webpage based on content representations for training navigation paths, analytics representations for the training navigation paths, data representations for training pieces of augmentation data, and data analytics for the training pieces of augmentation data;

identifying one or more additional ones of the multiple plausible pieces of augmentation data;

modifying the first webpage to include the first augmentation data and the identified one or more additional ones of the multiple pieces of augmentation data, resulting in a modified webpage, a total number of pieces of augmentation data to be included in the modified webpage having been identified by an administrator via input to a user interface allowing the administrator to select how many pieces of augmentation data can be added to the first webpage; and causing the modified webpage rather than the first webpage to be communicated to the remote computing device.

12. The computing device as recited in claim 11, the global content preferences include webpage analytics for the first augmentation data as well as multiple additional pieces of augmentation data.

13. The computing device as recited in claim 11, the operations further including generating a content representation for the navigation path based on the multiple webpages in the navigation path, and the identifying being based on the content representation for the navigation path.

14. The computing device as recited in claim 13, the operations further including generating an analytics representation for the navigation path based on the analytics of the multiple webpages in the navigation path, and the predicting being based on the analytics representation for the navigation path.

15. The computing device as recited in claim 14, the generating the content representation for the navigation path comprising generating the content representation using a first long-short term memory network, and the generating the analytics representation for the navigation path comprising generating the analytics representation using a second long-short term memory network.

16. The computing device as recited in claim 14, the operations further including:

generating, for each of multiple plausible pieces of augmentation data, a data representation of the plausible piece of augmentation data;

determining, for each of the multiple plausible pieces of augmentation data, a value based on the content representation for the navigation path, the analytics representation for the navigation path, the data representation for the plausible piece of augmentation data, and data analytics for the plausible piece of augmentation data; and the identifying comprising identifying, as the first augmentation data, one of the multiple plausible pieces of augmentation data having a highest value.

17. The computing device as recited in claim 11, the operations further comprising:

determining whether content replacement for the first webpage is enabled;

the modifying comprising, in response to content replacement for the first webpage not being enabled, adding the first augmentation data to the first webpage; and the modifying comprising, in response to content replacement for the first webpage being enabled, identifying content on the first web page and replacing the content on the first webpage with the first augmentation data.

18. A system comprising:

an input module to receive, from a remote computing device, a request for a first webpage on a website that a user navigated to during a web browsing session;

means for identifying, that accounts for global content preferences as well as a navigation path through multiple webpages on the website that the user has taken during the web browsing session rather than navigation paths through multiple web pages that the user took during previous web browsing sessions, augmentation data for the first webpage, the global content preferences including, for each of the multiple webpages in the navigation path, webpage analytics from multiple users that accessed the webpage, the means for identifying including an augmentation data prediction module having been trained to identify as the augmentation data one of multiple plausible pieces of augmentation data based on content representations for training navigation paths, analytics representations for the training navigation paths, data representations for training pieces of augmentation data, and data analytics for the training pieces of augmentation data;

means for modifying the first webpage to include the augmentation data, resulting in a modified webpage, including determining whether content replacement for the first webpage is enabled, in response to content replacement for the first webpage not being enabled, adding the first augmentation data to the first webpage, and in response to content replacement for the first webpage being enabled, identifying content on the first web page and replacing the content on the first webpage with the first augmentation data; and causing the modified webpage to be communicated to the remote computing device in place of the first webpage.

19. The system as recited in claim 18, the means for identifying comprising means for identifying as the augmentation data a webpage that is likely to extend the web browsing session and keep the user on the website.

20. The system as recited in claim 18, the means for modifying further comprising:

identifying one or more additional ones of the multiple plausible pieces of augmentation data; and modifying the first webpage to include as augmentation data the identified one or more additional ones of the multiple plausible pieces of augmentation data, resulting in the modified webpage, a total number of pieces of augmentation data to be included in the modified webpage having been identified by an administrator via input to a user interface allowing the administrator to select how many pieces of augmentation data can be added to the first webpage.

* * * * *